United States Patent Office 2,847,400
Patented Aug. 12, 1958

2,847,400

ACRYLIC AND METHACRYLIC DERIVATIVES OF UREA AND POLYMERS THEREOF

Newman M. Bortnick, Oreland, Pa., assignor to Rohm & Haas Company, Philadelphia, Pa., a corporation of Delaware No Drawing. Application June 10, 1955
Serial No. 514,767

9 Claims. (Cl. 260—77.5)

This invention relates to new compounds, polymers thereof, and methods of making them. This application is a continuation-in-part of my copending application Serial No. 434,317, filed June 3, 1954, now abandoned.

The present invention deals with compounds having the general Formula I:

I
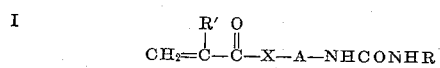

in which R is a tertiary alkyl group of four to twenty-four, preferably four to ten, carbon atoms having a tertiary carbon attached directly to the adjacent nitrogen atom, R' is a methyl group or hydrogen, X is selected from —O— and —NH—, and A is an alkylene group of 2 to 4 carbon atoms, of which at least 2 extend in a chain between the adjoining X and NH radicals.

Typical of the R members that may be employed for the purposes of this invention are tertiary butyl, tertiary hexyl, tertiary octyl, tertiary decyl, tertiary dodecyl, tertiary tetradecyl and tertiary octadecyl groups. Among the typical A members that may be employed as linkages are ethylene (—CH$_2$CH$_2$—), propylene (—CH(CH$_3$)CH$_2$— or —CH$_2$CH(CH$_3$)—)

trimethylene (—CH$_2$CH$_2$CH$_2$—), and butylenes (e. g. —C(CH$_3$)$_2$CH$_2$— or —CH(CH$_3$)CH(CH$_3$)— or —CH$_2$C(CH$_3$)$_2$—).

The monomeric compounds (esters) of the present invention in which X is O may be made by the reaction of a primary amine of Formula II with an isocyanate of Formula III:

II               RNH$_2$

III            CH$_2$=C(R')COOANCO where the symbols are defined as above. These isocyanates and their preparation are disclosed and claimed in my copending application Serial No. 319,603, filed November 6, 1952, now U. S. Patent 2,718,516. Specific examples include β-isocyanatoethyl methacrylate; β-isocyanatoethyl acrylate; 4-isocyanatobutyl acrylate;

CH$_2$=C(CH$_3$)COOCH$_2$C(CH$_3$)$_2$NCO

CH$_2$=C(CH$_3$)COO(CH$_2$)$_3$NCO

CH$_2$=CHCOOCH(CH$_3$)CH$_2$NCO and

CH$_2$=C(CH$_3$)COOCH$_2$CH(C$_2$H$_5$)NCO

Examples of the amines of Formula II include t-butylamine; t-hexylamine; t-octylamine; t-decylamine; t-dodecylamine; t-tetradecylamine; and t-octadecylamine.

The reaction of the amine with the isocyanate is generally spontaneous and exothermic. In many cases, it may be desirable to control the temperature by cooling, such as to avoid temperatures exceeding 85° to 90° C. Control may also be obtained, where necessary, by gradually adding one reagent to the other. The reaction is quantitative and stoichiometrically equivalent amounts of the reagents are preferably used.

The monomeric compounds (amides) of the present invention may be made by reacting an acrylyl or methacrylyl halide, such as the chloride, with the reaction product of a t-alkyl isocyanate of Formula IV with an alkylene diamine of Formula V following:

IV             RNCO

V              H$_2$NANH$_2$ where the symbols have the same definition as above. Examples of the isocyanates are t-butyl isocyanate, t-hexyl isocyanate, t-octyl isocyanate, t-decyl isocyanate, t-dodecyl isocyanate, t-tetradecyl isocyanate, t-hexadecyl isocyanate, t-octadecyl isocyanate. Examples of the diamines include ethylenediamine, trimethylenediamine, tetramethylenediamine, 2-methyl-1,2-diaminopropane.

The reaction between the isocyanate and the diamine is spontaneous and exothermic. A hydrocarbon solvent is used as the reaction medium. Aromatics like benzene, toluene and xylenes may be used, but aliphatics like iso-octane, heptane, and the like are preferred because any bis-ureido by-products is less soluble therein than in the aromatics. It is preferred to use an excess of the amine. Generally, the reaction may be allowed to proceed at temperatures from normal room temperature up to about 90° C., but preferably it is cooled to maintain the reaction mass at about 0° to 40° C. If desired, one reactant may be added gradually to the other to aid in controlling the temperature of the reaction mass. The product of this reaction has the general Formula VI:

VI            RNHCONHANH$_2$

Any bis-ureido by-product is removed by filtration. The remaining diamine is washed out with water, and the solvent is then removed by distillation. The compound of Formula VI is then reacted with the acrylyl or methacrylyl halide. A base acceptor is used to take up the hydrogen halide liberated. If desired, an excess of the amine of Formula VI may be used for this purpose. Preferably, however, stoichiometrically equivalent proportions of the halide and the compound of Formula III are used and an organic base, such as an amine like pyridine, triethylamine, or an inorganic base like NaOH, Na$_2$CO$_3$, sodium bicarbonate, calcium carbonate, or lime, or basic reacting salts like sodium acetate may be used as the hydrogen chloride acceptor. The temperature may vary from 0° to 70° C. Polymerization inhibitors, such as hydroquinone, may be used and are especially important when temperatures above about 25° C. are employed. Preferably, the temperature is kept low in the range of 0° to 20° C. whether or not a polymerization inhibitor is used. After the reaction is completed (and yields are generally 90% and higher), the salt is removed by filtration, and, if an amine acceptor is used, any excess thereof left is distilled off the reaction product.

The monomers of Formula I in which R has from 4 to 8 carbon atoms are solids of clearly defined crystallinity. As the size of R increases beyond this point, the compounds retain their solid character but shown progressively less crystallinity until when R has 16 to 18 carbon atoms, they are soft, non-crystalline solids having a lubricous feel. The compounds of Formula I are generally insoluble in water but are soluble in a wide variety of organic solvents, such as lower hydrocarbon solvents of aliphatic, naphthenic, or aromatic character, such as benzene, toluene, xylenes, mineral spirits, in ethers such as ordinary ether, ketones, such as acetone, methyl ethyl ketone, dioxane, and tetrahydrofuran, esters, such as ethyl, butyl, and amyl acetates, and ethoxyethyl acetate, chlorinated hydrocarbons, such as carbon tetrachloride, ethylenedichloride, chloroform.

Both the ester and amide types of monomers of Formula I thus obtained are effective bactericides, fungicides, and insecticides, especially against army worms, bean beetles, and aphids. These amides and esters of Formula I in which R has from 12 to 18 carbon atoms are useful for softening, lubricating, and imparting water-repellency to substrates, such as leather, to which they may be applied merely by rubbing or as an added component in the normal fat-liquoring operation. Those amides and esters of Formula I in which R has from 4 to 12 carbon atoms are useful additives to adhesives, especially of the collodion type.

The monomers are polymerizable by themselves to form homopolymers or even more advantageously with other monoethylenically unsaturated compounds, such as polymerizable vinylidene compounds, to form valuable linear copolymers. These polymers, including both the homopolymers and the copolymers, are adapted to be insolubilized by a cross-linking operation to produce novel hard or rubbery films of great value as protective coatings particularly for wood or metal.

Typical of the polymerizable vinylidene or monoethylenically unsaturated compounds that may be employed to produce copolymers include: vinyl ethers, such as vinyl methyl ether, vinyl butyl ether, vinyl octyl ether, vinyl dodecyl ether, or vinyl stearyl ether; allyl ethers, such as allyl butyl ether, allyl vinyl ether, allyl octyl ether, or allyl decyl ether; acrylates, such as methyl acrylate, ethyl acrylate, butyl acrylate, octyl acrylate, or stearyl acrylate; methacrylates, such as methyl methacrylate, ethyl methacrylate, butyl methacrylate, or octyl methacrylate; acrylamides or methacrylamides, such as methyl acrylamide, methyl methacrylamide, butyl acrylamide, or butyl methacrylamide; vinyl esters, such as vinyl acetate, vinyl butyrate, or vinyl stearate; allyl esters, such as allyl butyrate, allyl palmitate, or allyl stearate; maleates, such as butyl maleate, octyl maleate, or dodecyl maleate; itaconates, such as octyl itaconate, dodecyl itaconate, or octadecyl itaconate; styrenes, such as styrene, or vinyl toluene, or maleic anhydride, acrylonitrile, or the like.

The amount of the compound of Formula I in the copolymers of this invention may be widely varied. Amounts in the range of 5% to 95% have yielded highly satisfactory results in forming insoluble, cross-linked coatings. The remainder may comprise one or more of the other polymerizable vinylidene compounds previously mentioned. Preferred copolymers are those comprising from 5 to 20 mole percent of at least one monomer of Formula I. A preferred group of comonomers is that consisting of the alkyl esters of acrylic and methacrylic acids having from 1 to 18 carbon atoms in the alkyl group.

The polymerization, including the copolymerization, method of the present invention is essentially a two stage operation. As a primary or first stage, there is carried out homopolymerization of a compound of Formula I or copolymerization between a compound of the general Formula I and a polymerizable vinylidene compound, by uniting the monomer or monomers preferably but not necessarily through the agency of a polymerization catalyst or initiator such as benzoyl peroxide, boron trifluoride, azodiisobutyronitrile, or the like. The polymerization may be conducted as a bulk, solution, or dispersion process, as desired. It is preferable that the polymerization be conducted in the temperature range of 0° to 125° C., and it is necessary that the temperature does not exceed about 175° C. Appreciably above 175° C., undesirable side reactions may occur which would interfere with the desired copolymerization process. Hence, such higher temperatures should be avoided. The primary or first stage in the instant polymerization process results in a linear type homopolymer or copolymer that is soluble in organic solvents such as toluene, β-ethoxyethyl acetate, or the like. This linear homopolymer or copolymer is a viscous or solid product that can be applied from a solution in a thin film to a flat metal, glass or wooden surface. After drying at temperatures up to about 125° C. for about thirty minutes, the film is sometimes still tacky although sometimes hard and brittle and is quickly attacked by and dissolved in β-ethoxyethyl acetate and other solvents. This film is valuble in instances where temporary coating protection is needed. After the need for the protection ceases the film is easily removed by solvents.

The secondary stage in the present method is achieved by heating the linear homopolymer or copolymer formed in the first stage in the thermal conversion range which is at temperatures of about 175° to 300° C. for a period of time ranging preferably from 15 minutes to one hour depending to some extent on the individual polymer concerned and to a greater extent on the temperature employed. Generally, the higher the temperature used the shorter the time needed. In any case the heating is continued until conversion to the second stage polymer is complete. The completion of conversion is readily observable. As the heating of the linear copolymer progresses, a compound of the Formula VII:

VII  RNHCONHR wherein R is the same as defined above, is split off, and is obtained by distillation. Compounds of Formula VII are usually either viscous liquids or crystalline solids at normal temperatures. However, at the temperatures of reaction above about 175° C. these compounds are unstable and are equilibrium according to the equation

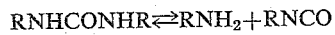 $RNHCONHR \rightleftharpoons RNH_2 + RNCO$

The range of temperatures employed in the instant invention favors the reaction to the right and the amine and isocyanate readily distill. If the components of the distillate are collected together the urea of Formula VII is reformed. Concurrently with the splitting off of the urea from the solvent-soluble linear homopolymer or copolymer, a solvent-insoluble space or three-dimensional homopolymer or copolymer is formed. This space polymer is believed to form by cross-linking occurring after the splitting off of the compound of Formula VII. The cross-linked space polymer is tough and either hard or rubbery, but never tacky. This polymer is valuable as a decorative and protective covering for preferably flat materials, particularly wood and metal. One practical way of achieving a film of the space polymer on a desired surface is to apply to the surface a film of the first stage or linear polymer and then applying heat to the film so that the temperature ranges between 175° to 300° C. The heating of the film, in the desired temperature range, should be continued until the first stage or linear polymer is completely converted to the second stage or cross-linked polymer. Usually, fifteen minutes to one hour is sufficient time to effect this conversion, as has been previously described. The completion of the conversion from the first stage to the second stage polymer can be observed from the condition of the film. The first stage polymer is dissolved by organic solvents such as toluene and β-ethoxyethyl acetate, whereas the second stage polymer is substantially harder than the first stage polymer and is not dissolved by organic solvents. The first stage or linear polymers of the present invention, and especially those containing 5 to 20 mol percent of at least one compound of Formula I and from 80 to 95 mol percent of at least one other type of monoethylenically unsaturated compound, especially the alkyl acrylates and methacrylates having from 1 to 18 carbon atoms in the alkyl groups, may be applied from solutions to the surfaces of refrigerator cabinets, washing machines, stoves, kitchen cabinets, and so on to form a coating thereon which is then converted to an insoluble, hard cross-linked resin which may form the main component of a protective enamel for such surfaces containing pigments, dulling agents, and so on. Those polymers which are of tough, rubbery character are useful as wire coatings, as in dish racks for drying dishes, etc.

In the following examples, which are illustrative of the invention, the parts are by weight unless otherwise specifically indicated.

Example 1

There are added together in a reaction vessel 31 parts of β-isocyanatoethyl methacrylate and 25.8 parts of tert-octylamine. An exothermic reaction occurs as the mixture is stirred. The heat of reaction causes a rise in temperature. When the heat of reaction has abated and the temperature has returned to room temperature, the stirring is discontinued and the product is removed from the reaction vessel. The product is identified as N-β-methacryloxyethyl-N'-t-octylurea of the formula

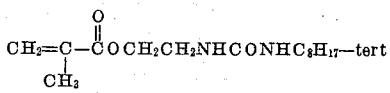

Example 2

The procedure of Example 1 is repeated replacing the methacrylate with 28.2 parts of β-isocyanatoethyl acrylate and the amine with 14.6 parts of t-butylamine. The product, $$CH_2=CHCOOC_2H_4NHCONH(t-C_4H_9)$$

is a crystalline solid.

Example 3

The procedure of Example 1 is repeated replacing the amine there used with 64.8 parts of a commercial mixture of t-carbinylamines having a molal equivalent weight of 324 (based on titration of amine) and in which the t-alkyl groups have from 18 to 24 carbon atoms, the main component being a t-octadecylamine. The mixed t-alkylureidoethyl methacrylate is a soft solid of lubricous character. When rubbed on leather, the latter became water-repellent and more flexible.

Example 4

The procedure of Example 1 is repeated replacing the methacrylate with 36.6 parts of β-methacryloxyisobutyl isocyanate. The product, N-t-octyl-N'-β-methacryloxy-t-butylurea, is a crystalline solid.

From the appropriate corresponding initial reactants, there are also produced by the procedure of Example 1 various compounds of Formula I including:

N-β-methacryloxyethyl-N'-t-decylurea
N-γ-methacryloxypropyl-N'-t-octadecylurea
N-β-acryloxypropyl-N'-t-tetradecylurea
N-β-acryloxy-t-butyl-N'-t-butylurea

Example 5

Anhydrous ethylenediamine in the amount of 58 parts in 200 parts of isooctane is mixed with 36.6 parts of tert-octyl isocyanate. The mixture is stirred for one hour at 0° C. and filtered. The filtrate is washed with several portions of water and then dried over anhydrous magnesium sulfate. The isooctane is removed by stripping. The residue is identified as $$tert-C_8H_{17}NHCONHCH_2CH_2NH_2$$

This residue is then reacted with an equivalent amount of methacrylyl chloride in the presence of sodium carbonate. The resulting compound on recrystallization from isooctane gives a melting point of 110°–111° C., and is identified as N-β-methacrylamidoethyl-N'-t-octylurea of the formula

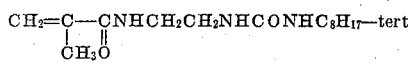

Example 6

The procedure of Example 5 is repeated replacing the methacrylyl chloride with an equivalent amount of acrylyl chloride, giving the crystalline product N-β-acrylamidoethyl-N'-t-octylurea.

Example 7

The procedure of Example 5 is repeated replacing the diamine with 75 parts of trimethylenediamine and the isocyanate with 25 parts of t-butyl isocyanate. The ultimate product, N-β-methacrylamidoethyl-N'-t-butylurea, is a crystalline solid.

Example 8

The procedure of Example 5 is repeated replacing the diamine with 85 parts of 2-methyl-1,2-diamino-propane and the methacrylyl chloride with an equivalent amount of acrylyl chloride. The ultimate product is N-β-acrylamido-t-butyl-N'-t-octylurea and is a crystalline solid.

Example 9

(a) There are mixed together in a reaction vessel 10 parts of N-β-methacrylamidoethyl-N'-t-octylurea, 90 parts of methyl methacrylate, and 300 parts of β-ethoxyethyl acetate. To this mixture 0.33 part of azodiisobutyronitrile is added. The mixture is heated at 70°–80° C. for a total of 24 hours. During the course of the reaction 0.33 part additions of azodiisobutyronitrile are made, first, at two hours and then at six hours. At the end of the reaction period the mixture is cooled to room temperature. This solution of the first stage copolymeric product is water white and viscous. A thin film of the first stage copolymer is applied to a flat plate of glass by casting this solution and allowing it to dry by standing at room temperature. The film remains tacky. The plate is heated at 125° C. for 30 minutes. The film then loses its tackiness and becomes hard and brittle. The film is readily attacked by and dissolved in β-ethoxyethyl acetate. One sample of the film is then heated at 200° C. for 30 minutes and another sample is heated at 250° C. for 15 minutes. In each case a tough, hard, clear second-stage cross-linked copolymeric film is produced that is insoluble in and only very slightly and very slowly attacked by β-ethoxyethyl acetate.

(b) Similar copolymeric compositions are obtained by the procedure of part (a) using up to about 90 parts of N-β-methacrylamidoethyl-N'-t-octylurea and down to about 10 parts of methyl methacrylate.

(c) A homopolymer is obtained by the procedure of part (a) by omitting the methyl methacrylate from the initial batch.

Example 10

(a) To a mixture of 10 parts of N-β-methacryloxyethyl-N'-t-octylurea, 90 parts of ethyl acrylate, and 300 parts of toluene in a reaction vessel there is added 0.33 part of benzoyl peroxide. The mixture is heated at 50°–75° C. for 24 hours during which time two 0.33 part additions of benzoyl peroxide are made. At the end of the reaction period the mixture is cooled to room temperature. This solution of the first stage copolymeric product is amber in color and viscous. A thin film of it is applied to a metal panel and allowed to stand. The film remains sticky to the touch. The panel is tacky after being heated at 125° C. for 30 minutes. The solvent-free film is at this stage still readily attacked by β-ethoxyethyl acetate. A portion of the dried film is heated for fifteen minutes at 250° C. This process produces a tough, rubbery, second stage, cross-linked copolymeric film that is swelled but not dissolved by β-ethoxyethyl acetate. A second portion of the amber-colored viscous solution of the first stage copolymer is diluted with additional toluene to a sprayable consistency and then sprayed by a conventional paint spray gun on a wire dish rack. The coated rack is then subjected to a baking operation at 250° C. for 15 minutes. The coating is tough and durable and effectively protects the wire from corrosion by water.

(b) In a similar manner by the procedure of part (a) copolymeric compositions are obtained from 85 parts of N-β-methacryloxyethyl-N'-t-octylurea and 15 parts of ethyl acrylate.

(c) Similarly, by the procedure of part (a), copolymeric compositions are made from 5 to 95 parts of N-β-methacryloxyethyl-N'-t-decylurea and 95 to 5 parts of octadecyl itaconate.

(d) A homopolymer is obtained by the procedure of part (a) by omitting the ethyl acrylate from the initial batch.

Example 11

There are added to a reaction vessel 25 parts of N-γ-methacryloxypropyl-N'-t-octadecylurea, 75 parts of vinyl dodecyl ether, and 100 parts of toluene. To this mixture there is added in 1 part portions at two three-hour intervals 3 parts of boron trifluoride. The mixture is heated to 50°–60° C. and maintained in that range for 9 hours. At the end of the reaction period the mixture is cooled to room temperature. The solution of the first stage copolymeric product thereby obtained is of an amber color and viscous. A thin film of it is applied to a flat glass plate and heated at 125° C. for 30 minutes. The film is soluble in β-ethoxyethyl acetate. The film is heated at 225° C. for 45 minutes which converts the first stage film to a second stage cross-linked film that is soft, rubbery, and swelled but not dissolved by organic solvents.

There is also produced copolymeric compositions from 5 to 95 parts of N-γ-methacrylamidopropyl-N'-t-octadecylurea or N-γ-methacrylamidopropyl-N'-t-octylurea and 95 to 5 parts of butyl methacrylamide.

Example 12

There is added to a mixture of 20 parts of N-β-acryloxypropyl-N'-t-tetradecylurea, 80 parts of methyl methacrylate, and 300 parts of β-ethoxyethyl acetate 0.33 part of benzoyl peroxide. The mixture is heated to and maintained at 75°–85° C. for 24 hours during which time two 0.33 part additions of benzoyl peroxide are made. At the conclusion of the reaction period the system is allowed to cool. A viscous solution of the first stage copolymeric composition is obtained. A thin film thereof is applied to a metal panel and heated at 125° C. for 30 minutes. The resultant film is hard but relatively easily attacked by β-ethoxyethyl acetate. The panel is heated at 250° C. for 30 minutes which converts the solvent-vulnerable first stage copolymeric film into an essentially solvent insoluble second stage copolymeric film.

Example 13

A mixture of 50 parts of N-β-acryloxy-t-butyl-N'-t-butylurea, 50 parts of dodecyl maleate, and 300 parts of toluene is reacted in a reaction vessel in the presence of 0.33 part of benzoyl peroxide. The mixture is heated to 100°–110° C. and maintained in that temperature range for a period of 24 hours. During the course of the reaction two 0.33 part additions of benzoyl peroxide are made to aid the progress of the polymerization reaction. At the conclusion of the reaction period the mixture is cooled to room temperature. A thin film of this solution of the first stage copolymeric product is applied to a flat plate of glass and allowed to stand. The tacky film is heated at 125° C. for 30 minutes. The film, after heating, is still soft and tacky. It is readily attacked by β-ethoxyethyl acetate. A portion of the first stage copolymeric film is heated at 175° C. for 40 minutes which converts it to a second stage copolymeric film. This second stage film is quite flexible and resistant to attack by β-ethoxyethyl acetate.

Example 14

In a manner similar to that employed in Example 13 copolymeric compositions are made from 5 to 95 parts of N-β-methacrylamidoethyl-N'-t-octylurea and 95 to 5 parts of vinyl toluene.

Example 15

There are added to a reaction vessel 45 parts of methyl methacrylate, 45 parts of ethyl acrylate, 10 parts of N-β-methacrylamidoethyl-N'-t-octylurea, and 250 parts of toluene. To this mixture there is added 1 part of benzoyl peroxide. The mixture is heated at 100°–110° C. for 24 hours. At the end of the reaction period the mixture is cooled to room temperature. The first stage copolymeric product is tacky. The first stage copolymeric product is heated at 200° C. for 30 minutes which converts it into a second stage copolymer that is flexible and tough.

Copolymeric compositions are prepared using 5 to 90 parts of methyl methacrylate, 5 to 90 parts of ethyl acrylate, and 5 to 90 parts of N-β-methacrylamidoethyl-N-t-octylurea. Generally the greater the amount of methyl methacrylate present the harder the copolymeric products are, and the greater the amount of ethyl acrylate the more rubbery the copolymeric products are.

Example 16

(a) The following components are placed in a reaction vessel equipped with a thermometer well and a mechanical agitator:

160 parts ethyl acrylate
63 parts N-β-methacrylamidoethyl-N'-t-octylurea
278 parts water
15 parts t-octylphenoxypolyethoxyethanol (average of about 10 oxyethylene units)

The mixture is cooled to 15° C. and then there are added 0.12 parts of ammonium persulfate and 0.16 parts of sodium hydrosulfite. The mixture is agitated and over a period of about a half-hour the temperature rises to about 40° C. Agitation is continued another half-hour while the resultant copolymer dispersion cools to room temperature.

(b) There are mixed and ground in a pebble mill 190 parts of titanium dioxide and 190 parts of zinc oxide in 189.5 parts of water containing 7.2 parts of diethylene glycol and as dispersing agents 3.8 parts of the sodium salt of a maleic anhydride/diisobutylene copolymer having a number average molecular weight of 3000 and 1.9 parts of an octylphenoxypolyethoxyethanol containing an average of about 11 oxyethylene units. When this mixture has been ground to a smooth, uniform paste, it is mixed with 516.0 parts of a dispersion of the interpolymer, which contains 46% solids, prepared by the procedure of part (a) hereof. When the parts used are pounds, this formula yields about 100 gallons of a white primer. It has a pigment to binder ratio of about 1.6:1. The resulting composition is an excellent primer for refrigerators, ironers and other household appliances that are finally coated with white or pastel-colored enamels and lacquers. Baking of the primer at about 250° C. for 15 minutes is effected promptly after drying the coating.

I claim:

1. A composition of matter comprising a compound $CH_2=CR'CONHANHCONHR$ where R is a tertiary alkyl group having 4 to 24 carbon atoms having a tertiary carbon atom attached to the adjacent nitrogen atom, R' is selected from the group consisting of H and $CH_3$, and A is an alkylene group of 2 to 4 carbon atoms, of which at least 2 extend in a chain between the adjoining NH radicals.

2. A composition of matter comprising N-β-methacrylamidoethyl-N'-t-octylurea.

3. A composition of matter comprising N-β-acrylamido-t-butyl-N'-t-octylurea.

4. A composition of matter comprising a polymer of a compound of claim 1.

5. A composition of matter comprising a copolymer of N-β-methacrylamidoethyl-N'-t-octylurea with another copolymerizable monoethylenically unsaturated compound.

6. A composition of matter comprising a copolymer of N-β-acrylamido-t-butyl-N'-t-octylurea with another copolymerizable monoethylenically unsaturated compound.

7. A composition of matter comprising a copolymer of N-β-methacrylamidoethyl-N'-t-octylurea with methyl methacrylate.

8. A method which comprises mixing and thereby reacting a t-alkyl isocyanate RNCO, in which R is a tertiary alkyl group having 4 to 24 carbon atoms having a tertiary carbon atom attached to the adjacent nitrogen atom, with an alkylene diamine H₂NANH₂ where A is an alkylene group of 2 to 4 carbon atoms of which at least 2 extend in a chain between the adjoining nitrogen atoms, thereby producing a product of the formula

RNHCONHANH₂ mixing the latter product with a halide of an acid selected from the group consisting of acrylic and methacrylic acids at a temperature of about 0° C. to 70° C. to effect reaction therebetween, and isolating a product defined in claim 1.

9. A method for preparing a polymeric composition comprising polymerizing in the presence of an addition polymerization initiator a compound as defined in claim 1 at a temperature below 175° C. and then heating the linear polymer at a temperature of at least 175° C. to effect cross-linking thereof.

References Cited in the file of this patent

UNITED STATES PATENTS 2,611,782    Bortnick _____ Sept. 23, 1952
2,694,695    Bortnick _____ Nov. 16, 1954

OTHER REFERENCES

Saunders: "Chemical Reviews," vol. 43, pages 203–218 (only page 208 relied upon), 1948. (Copy in Science Library.)